(12) United States Patent
Ouchi

(10) Patent No.: US 10,063,740 B2
(45) Date of Patent: Aug. 28, 2018

(54) IMAGE READING APPARATUS

(71) Applicant: KYOCERA Document Solutions Inc., Osaka-shi (JP)

(72) Inventor: Kei Ouchi, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

(21) Appl. No.: 15/597,667

(22) Filed: May 17, 2017

(65) Prior Publication Data

US 2017/0346987 A1 Nov. 30, 2017

(30) Foreign Application Priority Data

May 25, 2016 (JP) ................................. 2016-104580

(51) Int. Cl.
*H04N 1/393* (2006.01)
*H04N 1/028* (2006.01)
*H04N 1/195* (2006.01)
*H04N 1/40* (2006.01)

(52) U.S. Cl.
CPC .......... *H04N 1/393* (2013.01); *H04N 1/0281* (2013.01); *H04N 1/19531* (2013.01); *H04N 1/19547* (2013.01); *H04N 1/40056* (2013.01); *H04N 2201/0094* (2013.01)

(58) Field of Classification Search
CPC .. H04N 1/393; H04N 1/19531; H04N 1/0281; H04N 1/40056; H04N 1/19547; H04N 2201/0094
See application file for complete search history.

(56) References Cited

U.S. PATENT DOCUMENTS

2003/0095335 A1 5/2003 Ogi
2010/0002273 A1 1/2010 Schmidt et al.

FOREIGN PATENT DOCUMENTS

JP 2003-121608 4/2003

*Primary Examiner* — Christopher D Wait
(74) *Attorney, Agent, or Firm* — Gerald E. Hespos; Michael J. Porco; Matthew T. Hespos

(57) ABSTRACT

An image reading apparatus includes a light irradiator, an optical system and a photoelectric converter. The optical system includes a reflection mirror unit and an aperture unit. The reflection mirror unit includes first and second reflection areas successively provided in a main scanning direction. The aperture unit includes a light shielding portion and first and second light passing holes for allowing the passage of the light reflected by each of the first and second reflection areas. The photoelectric converter includes a light receiving surface having first and second light receiving areas configured to receive the light passed through each of the first and second light passing holes and successively arranged in the main scanning direction. A length of the light receiving surface along the main scanning direction is set to be equal to or longer than that of the image reading area along the main scanning direction.

5 Claims, 10 Drawing Sheets

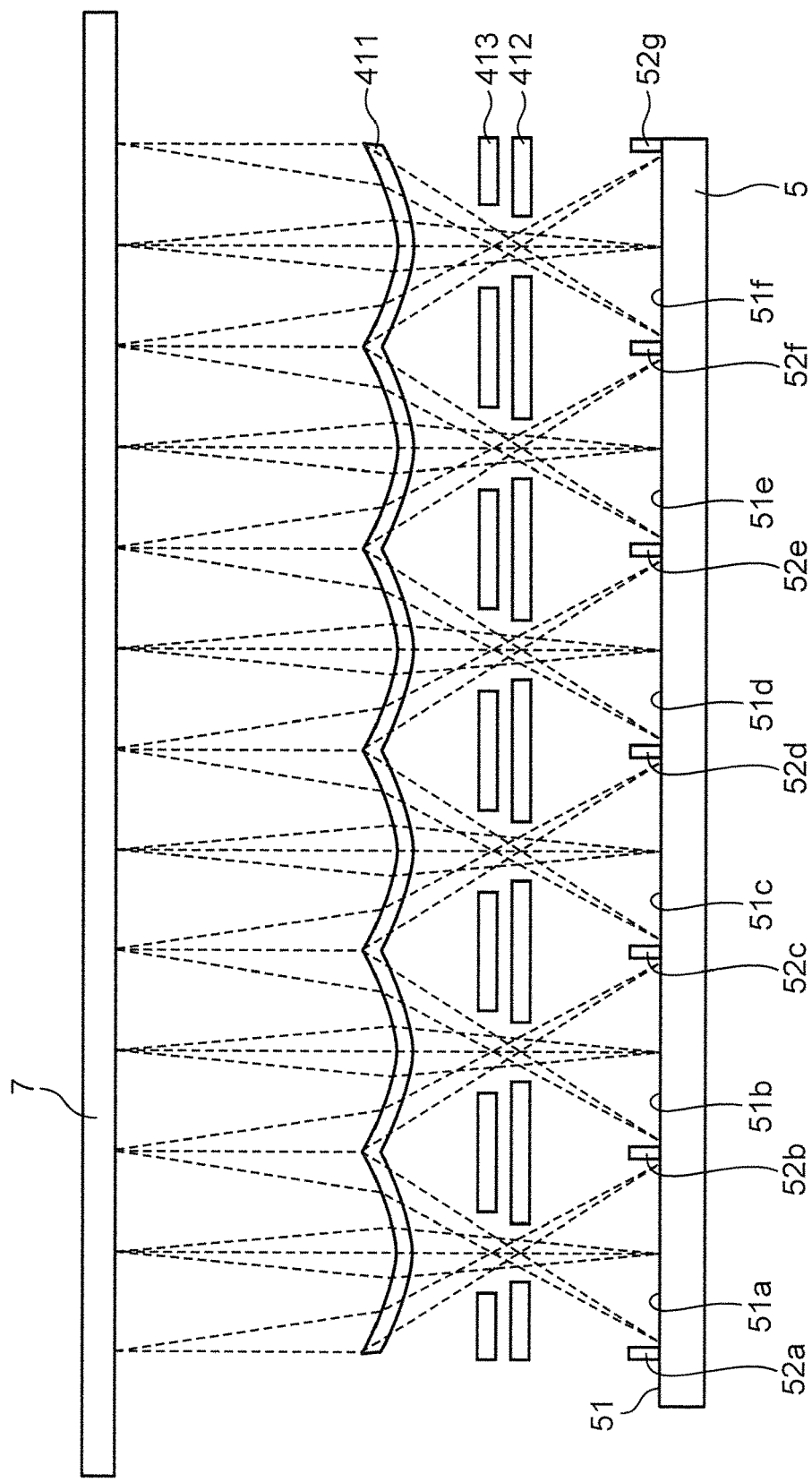

IMAGE READING APPARATUS

INCORPORATION BY REFERENCE

This application is based on Japanese Patent Application No. 2016-104580 filed with the Japan Patent Office on May 25, 2016, the contents of which are hereby incorporated by reference.

BACKGROUND

The present disclosure relates to an image reading apparatus for reading an image based on reflected light from a document.

Conventionally, an image forming apparatus such as a copier, facsimile machine, scanner or MFP is known which includes an image reading apparatus for reading an image based on reflected light from a contact glass. Image reading apparatuses of this type are generally roughly divided into image reading apparatuses of a reduction optical system type and image reading apparatuses of a nonmagnifcation optical system type.

An image reading apparatus of the reduction optical system type normally includes a plurality of mirrors and one optical lens and reads an image by introducing reflected light from a contact glass to the optical lens by the mirrors and imaging a reduced optical image on an image sensor functioning as a photoelectric converter. A length in a main scanning direction of the image sensor used in the image reading apparatus of the reduction optical system type is about ⅕ to ⅑ of a length in the main scanning direction of an image reading area of the contact glass.

On the other hand, an image reading apparatus of the nonmagnification optical system type normally includes a rod lens array, in which a plurality of rod lenses are arranged in an array, and reads an image by imaging reflected light from a contact glass as an unmagnified optical image on an image sensor by the rod lens array proximate to the contact glass.

SUMMARY

An image reading apparatus according to one aspect of the present disclosure reads an image based on reflected light from a document in a predetermined image reading area. The image reading apparatus includes a light irradiator configured to irradiate light to a document in the image reading area, an optical system configured to image reflected light from the document irradiated with the light by the light irradiator, and a photoelectric converter configured to convert an optical image imaged by the optical system into an electrical signal.

The optical system includes a reflection mirror unit and an aperture unit. The reflection mirror unit reflects the reflected light from the document to the photoelectric converter and images the reflected light on the photoelectric converter. This reflection mirror unit includes a first reflection area and a second reflection area successively provided in a main scanning direction. The aperture unit is arranged on an imaging optical path from the reflection mirror unit to the photoelectric converter. This aperture unit includes a light shielding portion having light shielding properties and a first light passing hole and a second light passing hole formed to penetrate through the light shielding portion and allow the passage of the light reflected by each of the first and second reflection areas.

The photoelectric converter is a line image sensor including a light receiving surface having a first light receiving area and a second light receiving area configured to receive the light passed through each of the first and second light passing holes and successively arranged in the main scanning direction, and configured to convert each optical image based on the light received by each of the first and second light receiving areas into an electrical signal. A length of the light receiving surface along the main scanning direction is set to be equal to or longer than that of the image reading area along the main scanning direction.

BRIEF DESCRIPTION OF THE DRAWINGS

FIG. 8 is an optical path diagram showing imaging optical paths in the image reading apparatus shown in FIG. 5, FIGS. 9A and 9B are diagrams showing a relationship between imaging light reflected by a reflection mirror array and flare light in the optical structure.

DETAILED DESCRIPTION

Figure 1:
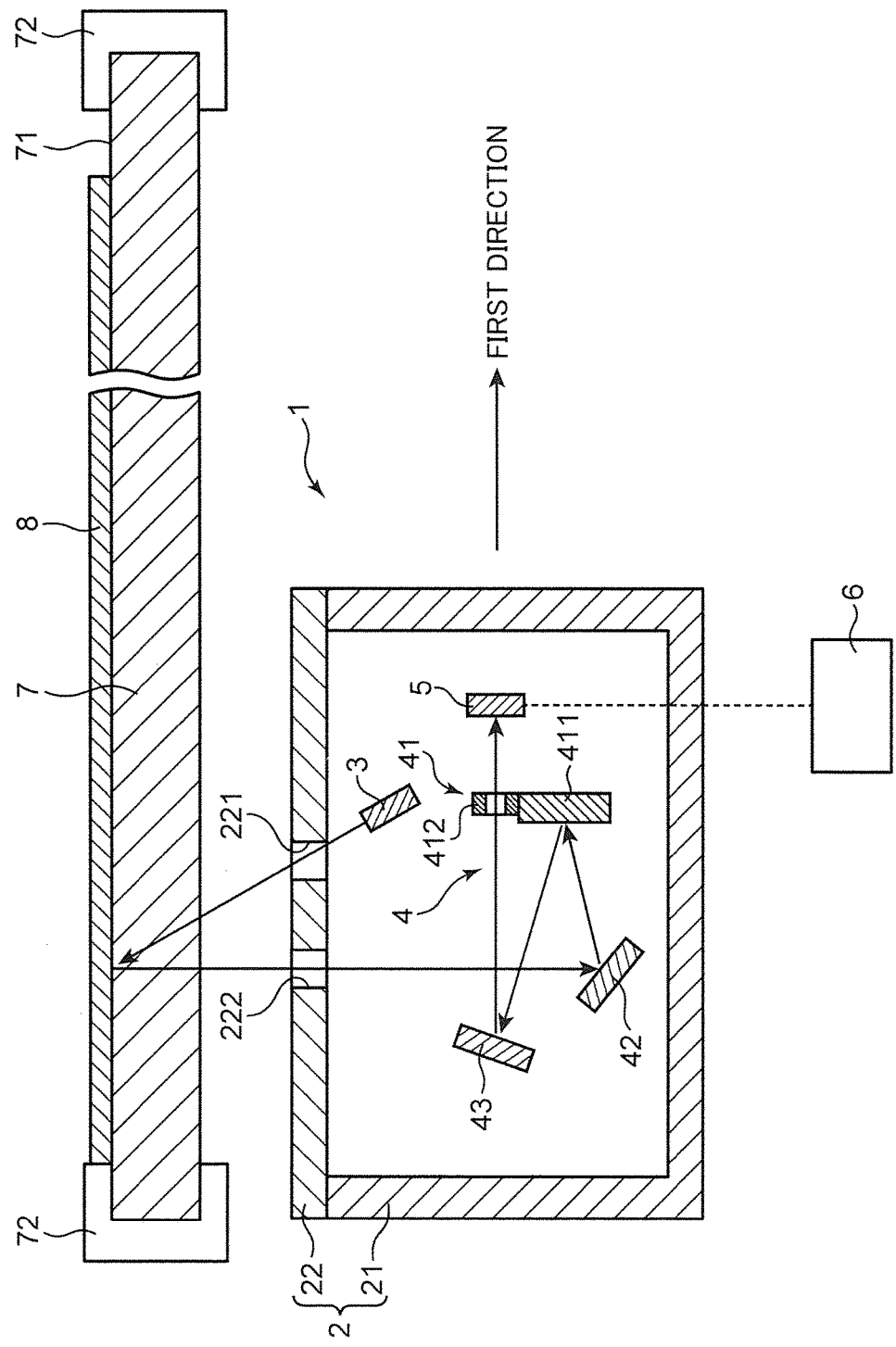
FIG. 1 is a sectional view showing a schematic configuration of an image reading apparatus according to a first embodiment of the present disclosure.

Hereinafter, an image reading apparatus according to one embodiment of the present disclosure is described on the basis of the drawings. FIG. 1 is a sectional view showing a schematic configuration of an image reading apparatus 1 according to a first embodiment of the present disclosure. The image reading apparatus 1 is an apparatus for reading an image based on reflected light from a document in a predetermined image reading area. In an example shown in FIG. 1, the image reading apparatus 1 reads an image based on reflected light from a document 8 placed in an image reading area on a document placing surface 71 of a contact glass 7. Note that the contact glass 7 is in the form of a rectangular plate and supported by a frame-shaped contact glass supporting portion 72. With the contact glass 7 supported by the contact glass supporting portion 72, an inner area of the contact glass supporting portion 72 serves as the image reading area on the document placing surface 72 of the contact glass 7. The image reading apparatus 1 is installed as an apparatus for carrying out an image reading mechanism in an image forming apparatus such as a copier, complex machine, facsimile machine, scanner or MFP.

The image reading apparatus 1 includes a carriage 2, a light irradiator 3, an optical system 4, a photoelectric converter 5 and an image data generator 6.

The carriage 2 is, for example, a molded article made of synthetic resin. The carriage 2 is arranged to face the document placing surface 71 of the contact glass 7 and movable in a predetermined first direction (e.g. sub scanning direction along long sides of the contact glass 7) along the document placing surface 71. The carriage 2 is configured to be movable in the first direction by a moving mechanism using a driving device such as a stepping motor. The carriage 2 includes a carriage body 21 and a lid body 22. The carriage body 21 has an internal space with an open upper side and is formed into a rectangular parallelepiped shape long in a second direction (main scanning direction) parallel to the document placing surface 71 and perpendicular to the first direction. This carriage body 21 houses the light irradiator 3, the optical system 4 and the photoelectric converter 5.

In the carriage 2, the lid body 22 is attached to a peripheral edge part of an upper opening of the carriage body 21 to close that opening. The lid body 22 is formed with a first slit 221 and a second slit 222 which are narrow and extend in a longitudinal direction (same as the second direction) of the lid body 22. The first slit 221 is a through port for introducing light emitted from the light irradiator 3 to be described later to the outside of the carriage 2. The second slit 222 is a through port for receiving reflected light from the document 8 placed in the image reading area on the document placing surface 71 of the contact glass 7 inside the carriage 2 and introducing the received reflected light to a first plane mirror 42 in the optical system 4 to be described later.

The light irradiator 3 is arranged in the carriage body 21 of the carriage 2. This light irradiator 3 irradiates light to the document 8 placed in the image reading area on the document placing surface 71 of the contact glass 7 via the first slit 221. The light irradiator 3 includes, for example, a light source with light emitting diode(s) (LED) arranged on one or both ends in the second direction, and a cylindrical light guide having a lateral end surface arranged to face the document 8 and formed of transparent resin. Light of the light source is incident on the lateral end surface of the light guide, and the light guide irradiates light to the document 8 while uniformly diffusing the light in the second direction. In another embodiment, the light irradiator 3 may be composed of a plurality of light emitting diodes arranged along the second direction.

The optical system 4 is arranged in the carriage body 21 of the carriage 2. This optical system 4 images reflected light from the document 8 placed in the image reading area of the document placing surface 71 and irradiated with the light by the light irradiator 3 on the photoelectric converter 5 to be described later. In this embodiment, the optical system 4 includes an optical structure 41, the first plane mirror 42 and a second plane mirror 43. In the optical system 4, the optical structure 41 includes a reflection mirror array 411 which is an example of a reflection mirror unit, and a beam regulating aperture unit 412 which is an example of an aperture unit.

The first plane mirror 42 is a reflection mirror formed into a planar shape extending along the second direction, and reflects the reflected light from the document 8 placed in the image reading area of the document placing surface 71 incident through the second slit 222 to the reflection mirror array 411 and introduces the reflected light to the reflection mirror array 411. The second plane mirror 43 is a reflection mirror formed into a planar shape extending along the second direction, and reflects the light reflected by the reflection mirror array 411 and introduces the reflected light to the beam regulating aperture unit 412.

In this embodiment, the reflection mirror array 411 and the beam regulating aperture unit 412 are integrally formed of synthetic resin in the optical structure 41. By the optical structure 41 in which the reflection mirror array 411 and the beam regulating aperture unit 412 are integrally formed, a positional relationship of the reflection mirror array 411 and the beam regulating aperture unit 412 can be maintained with high accuracy in the optical system 4 for imaging an optical image on the photoelectric converter 5. In addition, when temperature changes according to a state of use of the image reading apparatus 1, a difference in thermal expansion or contraction between the reflection mirror array 411 and the beam regulating aperture unit 412 can be suppressed. Thus, the degradation of imaging performance on the photoelectric converter 5 can be suppressed in the optical system 4 with the optical structure 41 including the reflection mirror array 411 and the beam regulating aperture unit 412.

Figure 2:
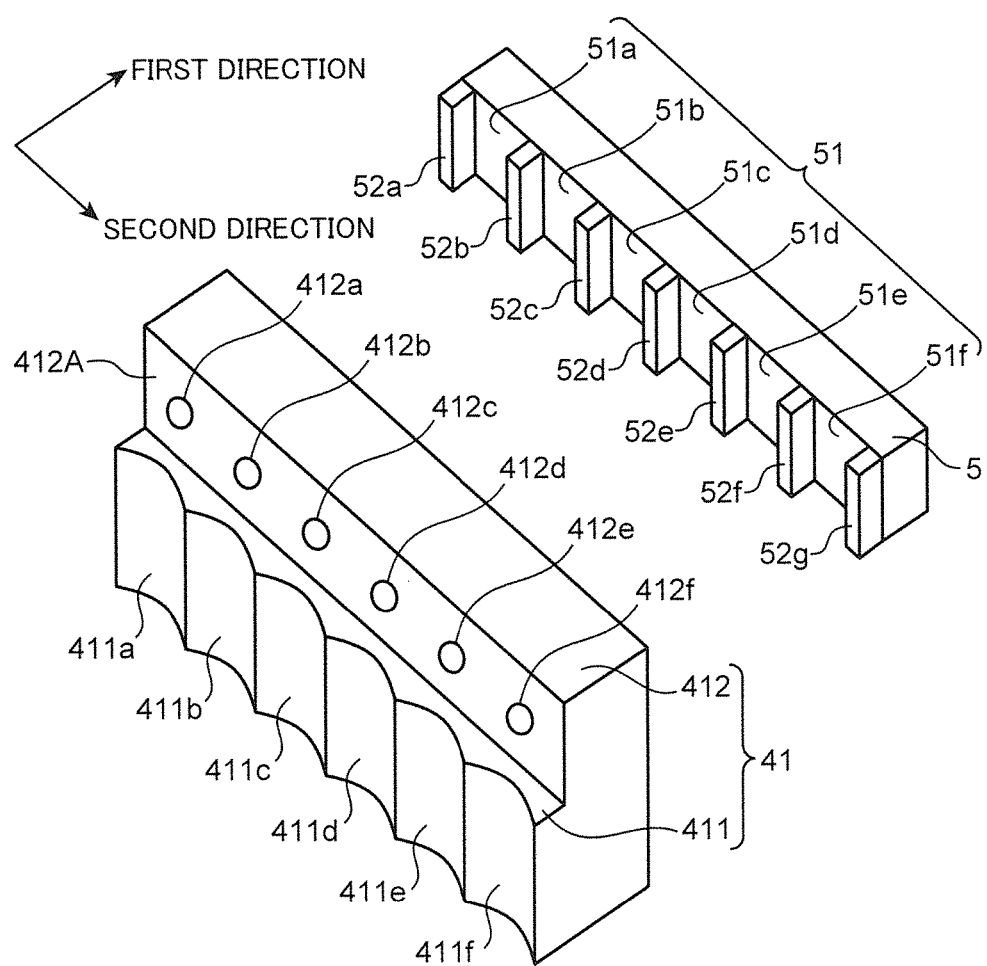
FIG. 2 is a perspective view showing the configurations of an optical structure and a photoelectric converter in the image reading apparatus shown in FIG. 1.
Figure 3:
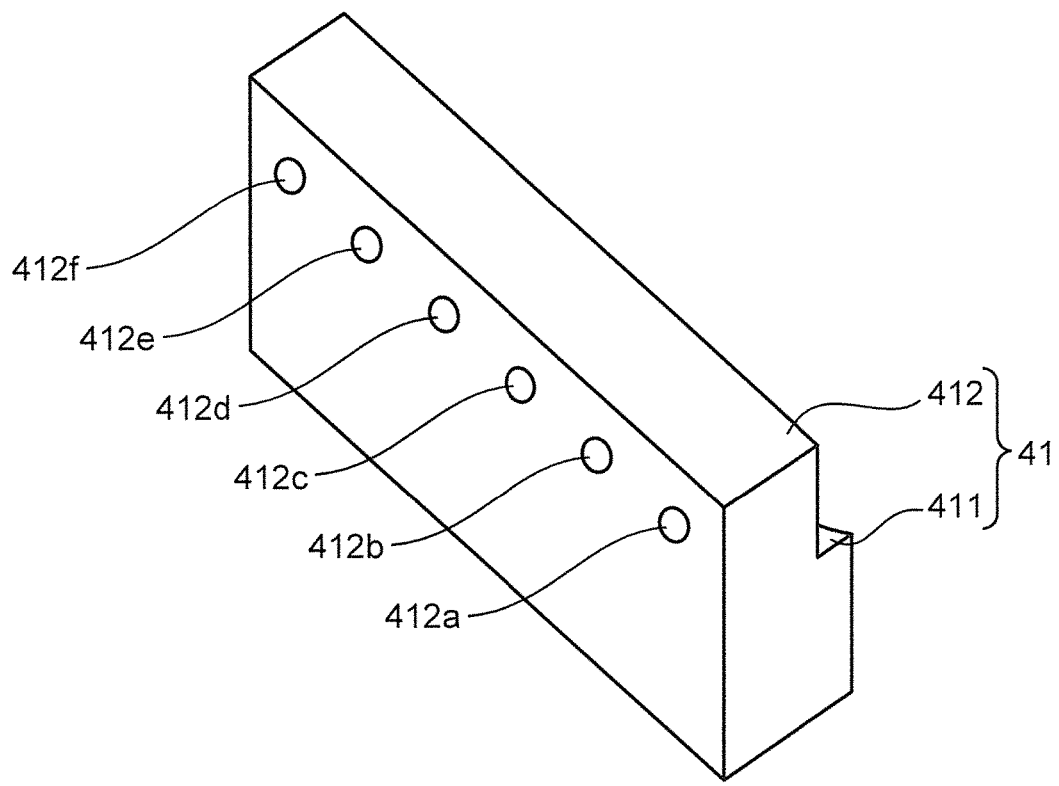
FIG. 3 is a perspective view showing the optical structure shown in FIG. 2 viewed from a side facing the photoelectric converter.
Figure 4:
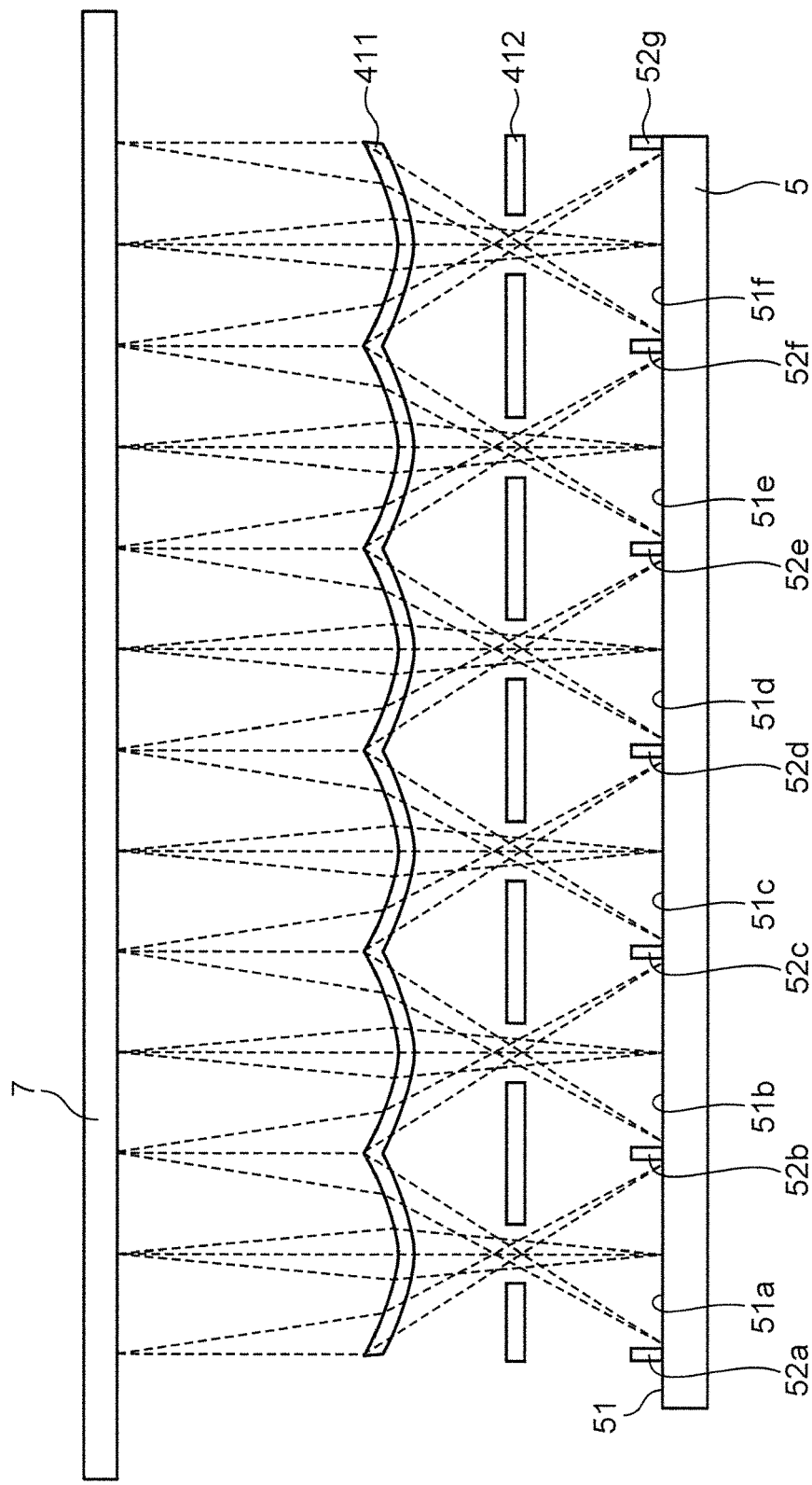
FIG. 4 is an optical path diagram showing imaging optical paths in the image reading apparatus shown in FIG. 1.

The configurations of the optical structure 41 and the photoelectric converter 5 in the image reading apparatus 1 of this embodiment are described in detail with reference to FIGS. 2 to 4. FIG. 2 is a perspective view showing the configurations of the optical structure 41 and the photoelectric converter 5 in the image reading apparatus 1 shown in FIG. 1. FIG. 3 is a perspective view showing the optical structure 41 shown in FIG. 2 viewed from a side facing the photoelectric converter 5. FIG. 4 is an optical path diagram showing imaging optical paths in the image reading apparatus 1 shown in FIG. 1. Note that although the reflection mirror array 411 reflects light in the optical structure 41, the reflection mirror array 411 is shown to transmit light in the optical path diagram shown in FIG. 4.

The reflection mirror array 411 reflects reflected light from the document 8 placed in the image reading area of the document placing surface 71 introduced by the first plane mirror 42 to the photoelectric converter 5 via the second plane mirror 43 and images the reflected light on the photoelectric converter 5. As shown in FIG. 2, the reflection mirror array 411 has a plurality of reflection areas in the form of curved surfaces successively provided in an array manner in the second direction. The reflection mirror array 411 has only to include at least a first reflection area 411a and a second reflection area 411b as the reflection areas, and the number of the reflection areas is not limited. In an example shown in FIG. 2, the reflection mirror array 411 is formed such that six reflection areas including the first reflection area 411a, the second reflection area 411b, a third reflection area 411c, a fourth reflection area 411d, a fifth reflection area 411e and a sixth reflection area 411f are successively provided in an array manner in the second direction.

The beam regulating aperture unit 412 is arranged on an imaging optical path from the reflection mirror array 411 to the photoelectric converter 5. The beam regulating aperture unit 412 is integrally formed to the reflection mirror array 411 on the upper surface of the reflection mirror array 411. The beam regulating aperture unit 412 includes a beam regulating/shielding portion 412A formed to extend along the second direction and having light shielding properties, and a plurality of light passing holes formed to penetrate through the beam regulating/shielding portion 412A. The beam regulating aperture unit 412 has only to include at least a first beam regulating/passing hole 412a (first light passing hole) and a second beam regulating/passing hole 412b (second light passing hole) as the light passing holes and the number of the light passing holes is not limited. In the example shown in FIG. 2, the beam regulating aperture unit 412 is formed such that the first beam regulating/passing hole 412a, the second beam regulating/passing hole 412b, a third beam regulating/passing hole 412c, a fourth beam regulating/passing hole 412d, a fifth beam regulating/passing hole 412e and a sixth beam regulating/passing hole 412f penetrate through the beam regulating/shielding portion 412A and are arranged along the second direction as six light passing holes as many as the reflection areas of the reflection mirror array 411. Note that each of the first to sixth beam regulating/passing holes 412a to 412f has a circular plan view shape.

The beam regulating aperture unit 412 shields part of the light reflected by the reflection mirror array 411 and introduced by the second plane mirror 43 by the beam regulating/shielding portion 412A to regulate a beam. In the beam regulating aperture unit 412, each of the first to sixth beam regulating/passing holes 412a to 412f allows the passage of the light reflected by each of the first to sixth reflection areas 411a to 411f on the reflection mirror array 411. The light passed through each of the first to six beam regulating/passing holes 412a to 412f is imaged on the photoelectric converter 5.

The photoelectric converter 5 is arranged in the carriage body 21 of the carriage 2. This photoelectric converter 5 convers an optical image imaged by the optical system 4 into an electrical signal. The photoelectric converter 5 is a line image sensor extending along the second direction. The photoelectric converter 5 has a light receiving surface 51 in which a first light receiving area 51a, a second light receiving area 51b, a third light receiving area 51c, a fourth light receiving area 51d, a fifth light receiving area 51e and a sixth light receiving area 51f for receiving light passed through each of the first to sixth beam regulating/passing holes 412a to 412f are successively arranged in the second direction. The photoelectric converter 5 converts each optical image based on the light received by each of the first to sixth light receiving areas 51a to 51f into an electrical signal. In the photoelectric converter 5 of this embodiment, a length of the light receiving surface 51 along the second direction is set to be equal to or longer than that of the image reading area on the document placing surface 71 of the contact glass 7 along the second direction.

In the photoelectric converter 5, light receiving elements constituting each of the first to sixth light receiving areas 51a to 51f are successively arranged along the second direction. CMOS (Complementary Metal Oxide Semiconductor) image sensors and CCD (Charge Coupled Device) image sensors are, for example, used as the light receiving elements. Note that, in the image reading apparatus 1 of this embodiment, a conjugate length expressed by a distance from the document placing surface 71 of the contact glass 7 to the photoelectric converter 5 is about 10 to 20 mm.

In the image reading apparatus 1 configured as described above, the carriage 2 is moved with respect to the document 8 in the first direction by the driving device with the document 8 placed on the document placing surface 71 of the contact glass 7. Then, light irradiated to the image reading area on the document placing surface 71 of the contact glass 7 from the light irradiator 3 during a movement of the carriage 2 is scanned in the first direction. Reflected light from the document 8 placed in the image reading area of the document placing surface 71 and irradiated with the light by the light irradiator 3 is reflected toward the reflection mirror array 411 of the optical structure 41 by the first plane mirror 42. The light having reached the reflection mirror array 411 is reflected toward the second plane mirror 43 by the first to sixth reflection areas 411a to 411f. The light having reached the second plane mirror 43 is reflected toward the beam regulating aperture unit 412 of the optical structure 41. Out of the light having reached the beam regulating aperture unit 412, the light passed through each of the first to sixth beam regulating/passing holes 412a to 412f is received by the first to sixth light receiving areas 51a to 51f on the light receiving surface 51 of the photoelectric converter 5. The photoelectric converter 5 converts each optical image based on the light received by each of the first to sixth light receiving areas 51a to 51f into an electrical signal, whereby an image of the document 8 is read.

According to the image reading apparatus 1 of this embodiment, the optical system 4 for imaging the reflected light from the document 8 placed in the image reading area of the contact glass 7 on the photoelectric converter 5 is provided with the optical structure 41 including the reflection mirror array 411 and the beam regulating aperture unit 412. Since the reflected light from the document 8 placed in the image reading area is reflected to the photoelectric converter 5 by each of the first to sixth reflection areas 411a to 411f on the reflection mirror array 411, the occurrence of chromatic aberration like the one occurring in a conventional imaging optical system using a lens can be suppressed.

Further, the photoelectric converter 5 includes the light receiving surface 51 in which the first to sixth light receiving areas 51a to 51f for receiving the light reflected by each of the first to sixth reflection areas 411a to 411f of the reflection mirror array 411 are successively arranged along the second direction. In the photoelectric converter 5, the length of the light receiving surface 51 along the second direction is set to be equal to or longer than that of the image reading area on the document placing surface 71 along the second direction. Specifically, the photoelectric converter 5 is not a special image sensor in which photoelectric conversion elements are discretely arranged on a base substrate and which is used in conventional image reading apparatuses, but a versatile line image sensor. Since the first to sixth light receiving areas 51a to 51f constituting the light receiving surface 51 are successively arranged in the photoelectric converter 5, a light receiving area for the light reflected by each of the first to sixth reflection areas 411a to 411f on the reflection mirror array 411 is larger than the conventional special image sensor in which the photoelectric conversion elements are discretely arranged. Thus, the light irradiator 3 needs not be able to irradiate light with high illuminance to the document placing surface 71 and the image reading apparatus 1 can save energy.

Furthermore, the beam regulating aperture unit 412 is arranged on the imaging optical path from the reflection mirror array 411 to the photoelectric converter 5. This enables the light reflected by each of the first to sixth reflection areas 411a to 411f of the reflection mirror array 411 to pass through each of the first to sixth beam regulating/passing holes 412a to 412f of the beam regulating aperture unit 412 and be introduced to each of the first to sixth light receiving areas 51a to 51f of the light receiving surface 51 in the photoelectric converter 5. Thus, even if the versatile line image sensor having the light receiving surface 51 in which the first to sixth light receiving areas 51a to 51f are successively arranged is used as the photoelectric converter 5 on which an optical image is to be imaged by the optical system 4, the light reflected by each of the first to sixth reflection areas 411a to 411f of the reflection mirror array 411 can be imaged in each of the first to sixth light receiving areas 51a to 51f.

Further, in the image reading apparatus 1 of this embodiment, the reflection mirror array 411 of the optical structure 41 is desirably a telecentric optical system for imaging the reflected light from the document 8 placed in the image reading area on the document placing surface 71 of the contact glass 7 into an inverted image.

Since the reflection mirror array 411 is a telecentric optical system, a main light beam, which is the light reflected by each of the first to sixth reflection areas 411a to 411f of the reflection mirror array 411 and passed through a center of each of the first to sixth beam regulating/passing holes 412a to 412f of the beam regulating aperture unit 412 is parallel to an optical axis (i.e. perpendicular to the light receiving surface 51 of the photoelectric converter 5). Thus, even if a document position deviated part such as a lifted part of the document 8 is present on the document placing surface 71 of the contact glass 7, imaging magnifications of optical images imaged by each of the first to sixth light receiving areas 51a to 51f on the light receiving surface 51 of the photoelectric converter 5 are unlikely to differ. As a result, the occurrence of image blur due to image bleeding in the read image can be suppressed and the image reading apparatus 1 can have a deep depth of field.

Further, in the image reading apparatus 1 of this embodiment, each of the first to sixth reflection areas 411a to 411f on the reflection mirror array 411 of the optical structure 41 is desirably configured to image an optical image, which is an inverted image reduced at a predetermined reducing magnification, in each of the first to sixth light receiving areas 51a to 51f on the light receiving surface 51 of the photoelectric converter 5. As shown in FIGS. 2 and 4, light shielding walls having light shielding properties are desirably provided in boundary parts between adjacent ones of the first to sixth light receiving areas 51a to 51f and in both end parts in the second direction on the light receiving surface 51 of the photoelectric converter 5.

Specifically, on the light receiving surface 51 of the photoelectric converter 5, a first light shielding wall 52a is provided in one end part in the second direction, a second light shielding wall 52b is provided in the boundary part between the first and second light receiving areas 51a, 51b, a third light shielding wall 52c is provided in the boundary part between the second and third light receiving areas 51b, 51c, a fourth light shielding wall 52d is provided in the boundary part between the third and fourth light receiving areas 51c, 51d, a fifth light shielding wall 52e is provided in the boundary part between the fourth and fifth light receiving areas 51d, 51e, a sixth light shielding wall 52f is provided in the boundary part between the fifth and sixth light receiving areas 51e, 51f and a seventh light shielding wall 52g is provided in another end part opposite to the one end part in the second direction.

By providing the first to seventh light shielding walls 52a to 52g, the incidence of part of the light reflected by each of the first to sixth reflection areas 411a to 411f of the reflection mirror array 411 and passed through each of the first to sixth beam regulating/passing holes 412a to 412f of the beam regulating aperture unit 412 on the light receiving areas adjacent to the light receiving area corresponding to each of the first to sixth beam regulating/passing holes 412a to 412f on the light receiving surface 51 of the photoelectric converter 5 can be suppressed. Thus, the formation of a ghost image in the read image can be suppressed.

Specifically, the first light shielding wall 52a suppresses outward propagation of part of the light reflected in the first reflection area 411a of the reflection mirror array 411 and passed through the first beam regulating/passing hole 412a of the beam regulating aperture unit 412 from the first light receiving area 51a on the light receiving surface 51 of the photoelectric converter 5. The second light shielding wall 52b suppresses the incidence of part of the light reflected in the first reflection area 411a and passed through the first beam regulating/passing hole 412a on the second light receiving area 51b adjacent to the first light receiving area 51a. The third light shielding wall 52c suppresses the incidence of part of the light reflected in the second reflection area 411b and passed through the second beam regulating/passing hole 412b on the third light receiving area 51c adjacent to the second light receiving area 51b. The fourth light shielding wall 52d suppresses the incidence of part of the light reflected in the third reflection area 411c and passed through the third beam regulating/passing hole 412c on the fourth light receiving area 51d adjacent to the third light receiving area 51c. The fifth light shielding wall 52e suppresses the incidence of part of the light reflected in the fourth reflection area 411d and passed through the fourth beam regulating/passing hole 412d on the fifth light receiving area 51e adjacent to the fourth light receiving area 51d. The sixth light shielding wall 52f suppresses the incidence of part of the light reflected in the fifth reflection area 411e and passed through the fifth beam regulating/passing hole 412e on the sixth light receiving area 51f adjacent to the fifth light receiving area 51e. The seventh light shielding wall 52g suppresses outward propagation of part of the light reflected in the sixth reflection area 411f and passed through the sixth beam regulating/passing hole 412f from the sixth light receiving area 51f on the light receiving surface 51.

Further, the image reading apparatus 1 of this embodiment includes the image data generator 6 as shown in FIG. 1. The image data generator 6 generates image data corresponding to the image recorded on the document 8 in accordance with electrical signals by the photoelectric converter 5 based on each optical image imaged in each of the first to sixth light receiving areas 51a to 51f on the light receiving surface 51 of the photoelectric converter 5. In this embodiment, the image data generator 6 includes an enlargement processing unit, an inversion processing unit and a coupling processing unit as processing units for processing each optical image imaged in each of the first to sixth light receiving areas 51a to 51f on the light receiving surface 51 of the photoelectric converter 5.

The enlargement processing unit performs a processing of enlargement at an enlarging magnification, which is an inverse of the reducing magnification set for the optical image imaged in each of the first to sixth light receiving areas 51a to 51f on the light receiving surface 51 of the photoelectric converter 5. The inversion processing unit performs a processing of inverting an inverted image, which becomes the optical image imaged in each of the first to sixth light receiving areas 51a to 51f on the light receiving surface 51 of the photoelectric converter 5, into an erect image. The coupling processing unit performs a processing of generating the image data corresponding to the image recorded on the document 8 by coupling each image after the processings by the enlargement processing unit and the inversion processing unit.

In the image data generator 6, for each optical image imaged in each of the first to sixth light receiving areas 51a to 51f on the light receiving surface 51 of the photoelectric converter 5, the enlargement processing unit enlarges at the enlarging magnification, which is an inverse of the reducing magnification, the inversion processing unit inverts the inverted image into an erect image and the coupling processing unit couples each image after the enlargement and inversion processings. By each processing in such an image data generator 6, the image data corresponding to the image recorded on the document 8 can be generated.

Figure 5:
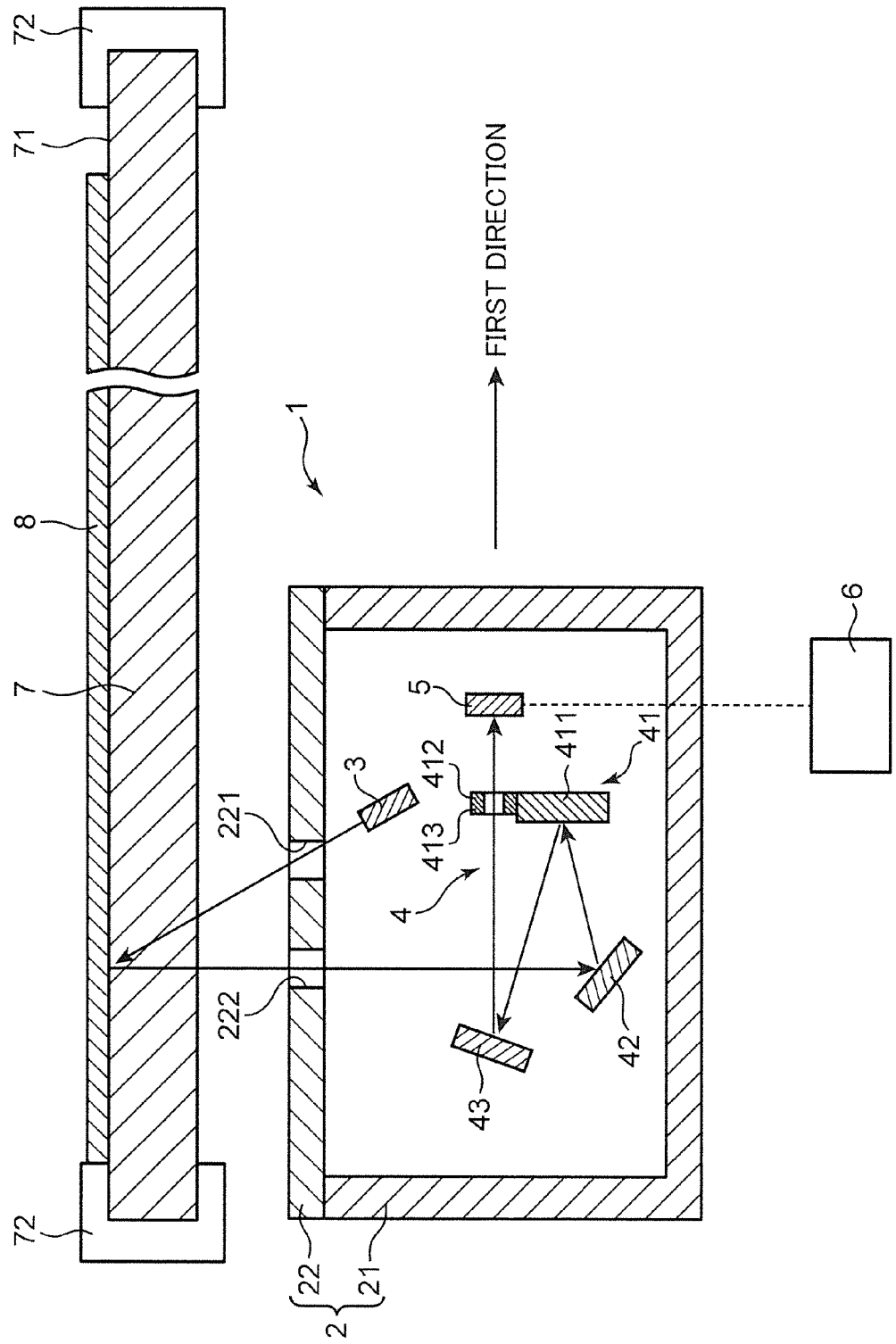
FIG. 5 is a sectional view showing a schematic configuration of an image reading apparatus according to a second embodiment of the present disclosure.
Figure 6:
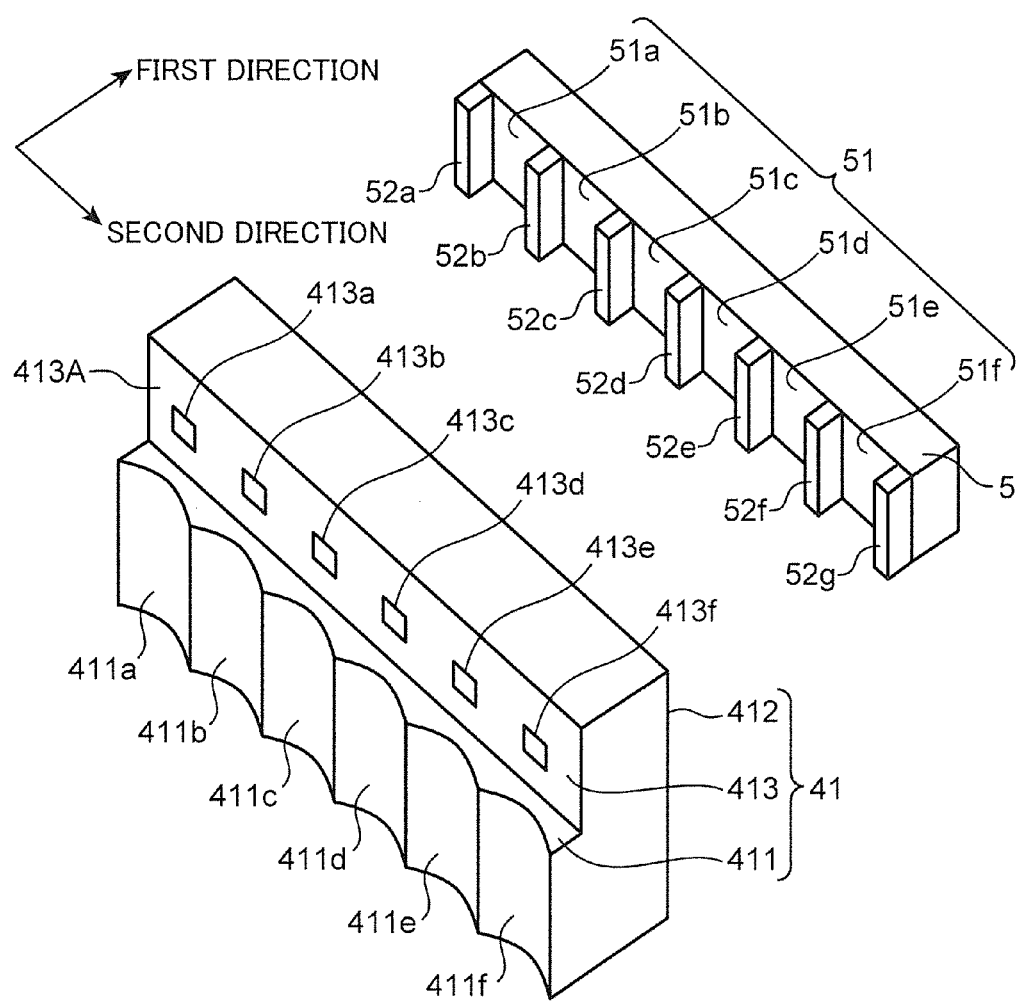
FIG. 6 is a perspective view showing the configurations of an optical structure and a photoelectric converter in the image reading apparatus shown in FIG. 5.
Figure 7:
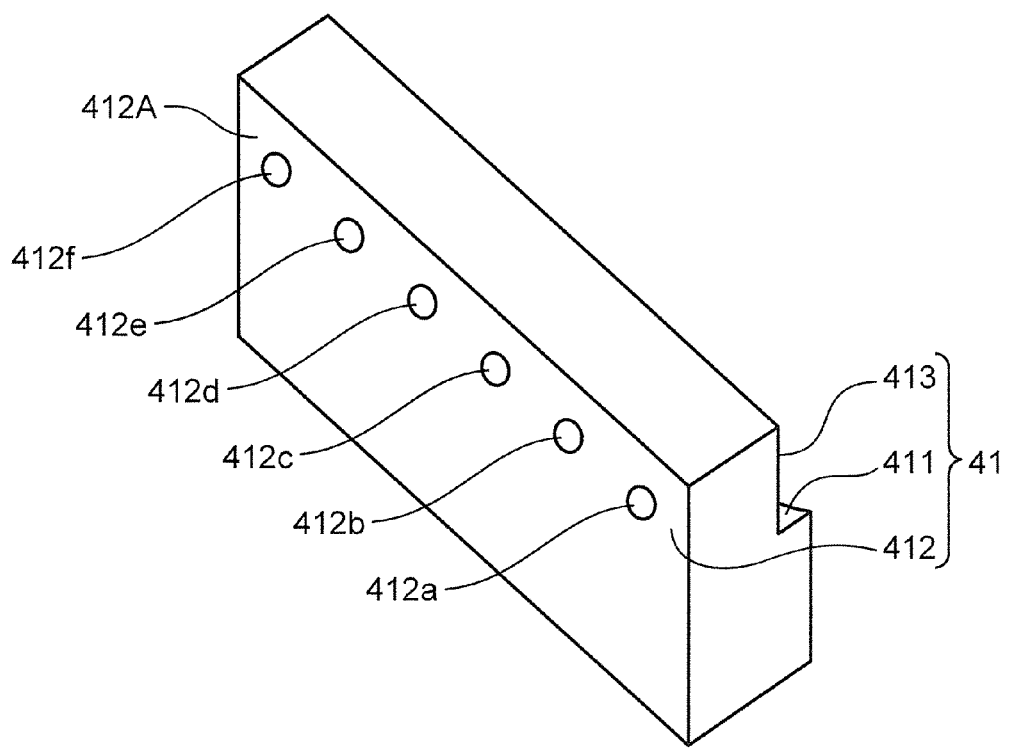
FIG. 7 is a perspective view showing the optical structure shown in FIG. 6 viewed from a side facing the photoelectric converter.

FIG. 5 is a sectional view showing a schematic configuration of an image reading apparatus 1 according to a second embodiment of the present disclosure. FIG. 6 is a perspective view showing the configurations of an optical structure 41 and a photoelectric converter 5 in the image reading apparatus 1 shown in FIG. 5. FIG. 7 is a perspective view showing the optical structure 41 shown in FIG. 6 viewed from a side facing the photoelectric converter 5. FIG. 8 is an optical path diagram showing imaging optical paths in the image reading apparatus shown in FIG. 5. Note that although a reflection mirror array 411 reflects light in the optical structure 41, the reflection mirror array 411 is shown to transmit light in the optical path diagram shown in FIG. 8.

The image reading apparatus 1 according to the second embodiment is configured similarly to the image reading apparatus 1 according to the first embodiment described above except that the optical structure 41 includes a flare light regulating aperture unit 413 in addition to the aforementioned reflection mirror array 411 and beam regulating aperture unit 412. As just described, the image reading apparatus 1 according to the second embodiment includes components similar to those of the image reading apparatus 1 according to the first embodiment described above. Thus, in the following description and drawings, corresponding similar components are denoted by the same reference signs and not described.

In the image reading apparatus 1 of this embodiment, the optical structure 41 includes the reflection mirror array 411, the beam regulating aperture unit 412 and the flare light regulating aperture unit 413. The reflection mirror array 411 reflects reflected light from a document 8 placed in an image reading area of a document placing surface 71 introduced by a first plane mirror 42 to a photoelectric converter 5 via a second plane mirror 43 and images the reflected light on the photoelectric converter 5. As shown in FIG. 6, the reflection mirror array 411 is formed such that six reflection areas including a first reflection area 411a, a second reflection area 411b, a third reflection area 411c, a fourth reflection area 411d, a fifth reflection area 411e and a six reflection area 411f are successively provided in an array manner in the second direction.

Since the reflected light from the document 8 placed in the image reading area of the document placing surface 71 is scattered in various directions, the light reflected by the first plane mirror 42 and having reached the reflection mirror array 411 is incident at various angles on the respective first to sixth reflection areas 411a to 411f. The light incident on each of the first to sixth reflection areas 411a to 411f of the reflection mirror array 411 and reflected by each of the first to sixth reflection areas 411a to 411f is imaged in each of the first to sixth light receiving areas 51a to 51f on the light receiving surface 51 of the photoelectric converter 5. However, the light incident at a specific angle on a boundary part between one reflection area and the reflection area adjacent to the one reflection area on the reflection mirror array 411 and reflected by that boundary part may be incident on the light receiving area corresponding to the one reflection area on the light receiving surface 51 of the photoelectric converter 5.

If the light generated in the boundary part with the reflection area adjacent to the one reflection area (hereinafter, referred to as "flare light") is incident on the light receiving area corresponding to the one reflection area on the light receiving surface 51 of the photoelectric converter 5 in this way, an image blur due to a flare phenomenon occurs in the read image based on the optical images imaged in the light receiving areas. Accordingly, the optical structure 41 of this embodiment includes the flare light regulating aperture unit 413 for regulating the incidence of the flare light in each of the first to sixth light receiving areas 51a to 51f on the light receiving surface 51 of the photoelectric converter 5.

In the optical structure 41, the flare light regulating aperture unit 413 is arranged on an imaging optical path from the reflection mirror array 411 to the photoelectric converter 5. The beam regulating aperture unit 412 is arranged between the flare light regulating aperture unit 413 and the photoelectric converter 5 on the above imaging optical path.

The flare light regulating aperture unit 413 includes a flare light regulating/shielding portion 413A formed to extend along the second direction and having light shielding properties, and a plurality of light passing holes formed to penetrate through the flare light regulating/shielding portion 413A. The flare light regulating aperture unit 413 has only to include at least a first flare light regulating/passing hole 413a and a second flare light regulating/passing hole 413b as the light passing holes and the number of the light passing holes is not limited. In an example shown in FIG. 6, the flare light regulating aperture unit 413 is formed such that the first flare light regulating/passing hole 413a, the second flare light regulating/passing hole 413b, a third flare light regulating/passing hole 413c, a fourth flare light regulating/passing hole 413d, a fifth flare light regulating/passing hole 413e and a sixth flare light regulating/passing hole 413f penetrate through the flare light regulating/shielding portion 413A and are arranged along the second direction as six light passing holes as many as the reflection areas of the reflection mirror array 411.

Figure 9A:
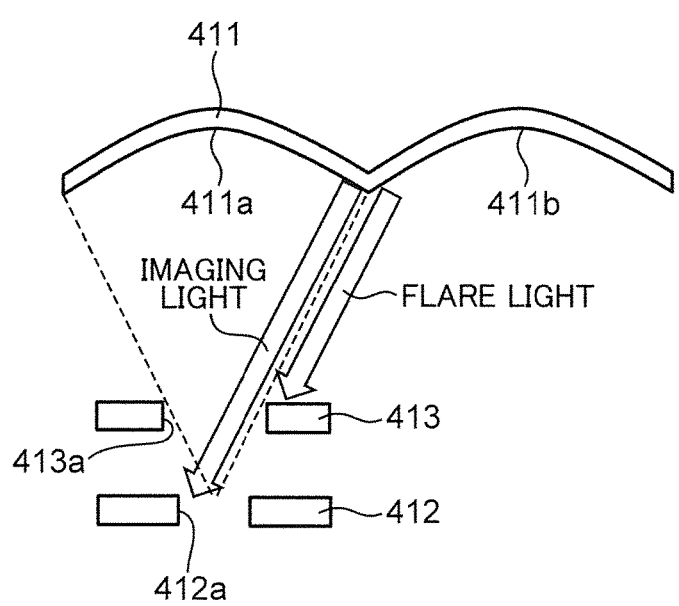
Figure 9B:
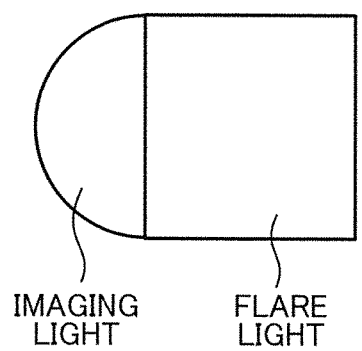

FIGS. 9A and 9B are diagrams showing a relationship between imaging light reflected by the reflection mirror array 411 and the flare light in the optical structure 41. The flare light regulating aperture unit 413 shields the flare light, out of the light reflected by the reflection mirror array 411 and introduced by the second plane mirror 43, by the flare light regulating/shielding portion 413A to regulate the passage of the flare light. In the flare light regulating aperture unit 413, the imaging light having the flare light cut, out of the light reflected by each of the first to sixth reflection areas 411a to 411f on the reflection mirror array 411 and introduced by the second plane mirror 43, is passed through each of the first to sixth flare light regulating/passing holes 413a to 413f.

Specifically, as shown in FIG. 9A, the first flare light regulating/passing hole 413a allows the passage of the imaging light reflected by the first reflection area 411a on the reflection mirror array 411 therethrough with the flare light generated in the boundary part of the second reflection area 411b with the first reflection area 411a on the reflection mirror array 411 shielded by the flare light regulating/shielding portion 413A. The second flare light regulating/passing hole 413b allows the passage of the imaging light reflected by the second reflection area 411b therethrough with the flare light generated in the boundary parts of the first and third reflection areas 411a and 411c with the second reflection area 411b shielded by the flare light regulating/ shielding portion 413A. The third flare light regulating/passing hole 413c allows the passage of the imaging light reflected by the third reflection area 411c therethrough with the flare light generated in the boundary parts of the second and fourth reflection areas 411b and 411d with the third reflection area 411c shielded by the flare light regulating/shielding portion 413A. The fourth flare light regulating/passing hole 413d allows the passage of the imaging light reflected by the fourth reflection area 411d therethrough with the flare light generated in the boundary parts of the third and fifth reflection areas 411c and 411e with the fourth reflection area 411d shielded by the flare light regulating/shielding portion 413A. The fifth flare light regulating/passing hole 413e allows the passage of the imaging light reflected by the fifth reflection area 411e therethrough with the flare light generated in the boundary parts of the fourth and sixth reflection areas 411d and 411f with the fifth reflection area 411e shielded by the flare light regulating/shielding portion 413A. The sixth flare light regulating/passing hole 413f allows the passage of the imaging light reflected by the sixth reflection area 411f therethrough with the flare light generated in the boundary part of the fifth reflection area 411e with the sixth reflection area 411f shielded by the flare light regulating/shielding portion 413A.

The light passed through each of the first to sixth flare light regulating/passing holes 413a to 413f in the flare light regulating aperture unit 413 is introduced to the beam regulating aperture unit 412. The beam regulating aperture unit 412 shields part of the light passed through each of the first to sixth flare light regulating/passing holes 413a to 413f in the flare light regulating aperture unit 413 by the beam regulating/shielding portion 412A to regulate the beam. Each of the first to sixth beam regulating/passing holes 412a to 412f allows the passage of the light passed through each of the first to sixth flare light regulating/passing holes 413a to 413f in the flare light regulating aperture unit 413 therethrough. The light passed through each of the first to sixth beam regulating/passing holes 412a to 412f is imaged in each of the first to sixth light receiving areas 51a to 51f on the light receiving surface 51 of the photoelectric converter 5. Note that each of the first to sixth beam regulating/passing holes 412a to 412f has a circular plan view shape.

According to the image reading apparatus 1 according to the second embodiment configured as described above, the flare light regulating aperture unit 413 is arranged on the imaging optical path from the reflection mirror array 411 to the photoelectric converter 5. Thus, the flare light generated in the boundary part between one reflection area and the reflection area adjacent to the one reflection area on the reflection mirror array 411 can be shielded by the flare light regulating/shielding portion 413A. Therefore, the incidence of the flare light generated in the boundary part with the reflection area adjacent to the one reflection area on the light receiving area corresponding to the one reflection area on the light receiving surface 51 of the photoelectric converter 5 can be regulated. As a result, the occurrence of image blur due to the flare phenomenon in the read image based on the optical images imaged in each of the first to sixth light receiving areas 51a to 51f on the light receiving surface 51 of the photoelectric converter 5 can be suppressed.

Since each of the first to sixth beam regulating/passing holes 412a to 412f in the beam regulating aperture unit 412 has a circular plan view shape, a spot of the imaging light passed through each of the first to sixth beam regulating/passing holes 412a to 412f is circular. However, a spot of the imaging light corresponding to the boundary part between one reflection area and the reflection area adjacent to the one reflection area on the reflection mirror array 411 is semicircular as shown in FIG. 9B. The flare light is generated in contact with a chord of a semicircular shape of the imaging light in the boundary part between one reflection area and the reflection area adjacent to the one reflection area on the reflection mirror array 411.

Thus, if the plan view shape of each of the first to sixth flare light regulating/passing holes 413a to 413f in the flare light regulating aperture unit 413 is set to be circular, part of the flare light is passed or part of the imaging light is shielded. Accordingly, the plan view shape of each of the first to sixth flare light regulating/passing holes 413a to 413f in the flare light regulating aperture unit 413 is desirably rectangular as shown in FIG. 6. In this way, the imaging light can be passed with only the flare light generated in the boundary part between one reflection area and the reflection area adjacent to the one reflection area on the reflection mirror array 411 shielded.

Figure 10:
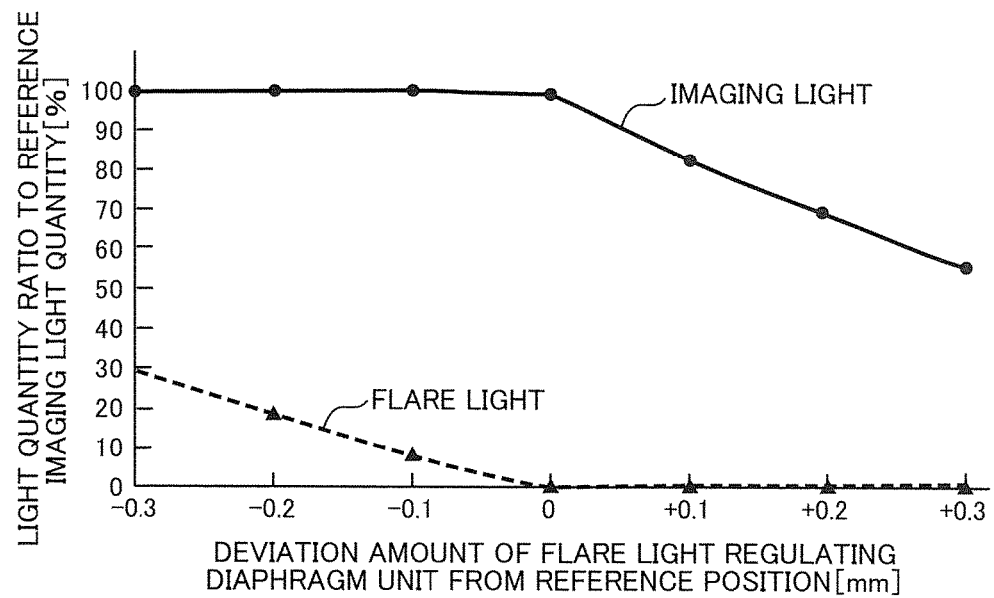
FIG. 10 is a graph showing a relationship between a deviation amount of a flare light regulating aperture unit in the optical structure from a reference position and a light quantity ratio to a reference imaging light quantity.

As described above, the flare light is generated in contact with the chord of the semicircular shape of the imaging light in the boundary part between one reflection area and the reflection area adjacent to the one reflection area on the reflection mirror array 411. Thus, to shield only the flare light without shielding the imaging light, the arrangement position of the flare light regulating aperture unit 413 needs to be set on the imaging optical path from the reflection mirror array 411 to the photoelectric converter 5 with high accuracy. FIG. 10 is a graph showing a relationship between a deviation amount of the flare light regulating aperture unit 413 from a reference position and a light quantity ratio to a reference imaging light quantity in the optical structure 41.

As is clear from the graph of FIG. 10, if the flare light regulating aperture unit 413 is arranged at a position (position with a deviation amount of "+0.1" in a horizontal axis of the graph) attained by a movement of "+0.1 mm" from the reference position (position with a deviation amount of "0" in the horizontal axis of the graph), part of the imaging light is shielded and the light quantity of the imaging light is reduced by about 20%. Further, if the flare light regulating aperture unit 413 is arranged at a position (position with a deviation amount of "−0.1" in the horizontal axis of the graph) attained by a movement of "−0.1 mm" from the reference position, part of the flare light is passed. Thus, to shield only the flare light without shielding the imaging light, the arrangement position of the flare light regulating aperture unit 413 needs to be set with high accuracy.

Thus, the flare light regulating aperture unit 413 is desirably integrally formed to the beam regulating aperture unit 412 in the optical structure 41. Further, in the optical structure 41, the beam regulating aperture unit 412, the flare light regulating aperture unit 413 and the reflection mirror array 411 are desirably integrally formed.

In this embodiment, the beam regulating aperture unit 412 and the flare light regulating aperture unit 413 are integrally formed to the reflection mirror array 411 on the upper surface of the reflection mirror array 411 as shown in FIGS. 6 and 7. By the optical structure 41 in which the beam regulating aperture unit 412, the flare light regulating aperture unit 413 and the reflection mirror array 411 are integrally formed, a positional relationship of the beam regulating aperture unit 412, the flare light regulating aperture unit 413 and the reflection mirror array 411 can be maintained with high accuracy in the optical system 4 for imaging an optical image on the photoelectric converter 5 and differences in thermal expansion or contraction among these three can be suppressed if temperature changes according to a state of use of the image reading apparatus 1. Thus, in the optical system 4 with the optical structure 41 including the reflection mirror array 411, the beam regulating aperture unit 412 and the flare light regulating aperture unit 413, the degradation of imaging performance on the photoelectric converter 5 can be suppressed.

Although the image reading apparatuses 1 according to the embodiments of the present disclosure are described above, the present disclosure is not limited to these. For example, the following modification can be employed.

In the above embodiments, the configuration of the image reading apparatus 1 is described in which the carriage 2 housing the light irradiator 3, the optical system 4 and the photoelectric converter 5 is moved in the first direction (sub scanning direction) with respect to the document 8 placed in the image reading area on the document placing surface 71 of the contact glass 7 and an image is read based on reflected light from the document 8. Without limitation to such a configuration, the present disclosure may relate to an image reading apparatus configured to convey the document 8 in the first direction (sub scanning direction) and read an image by the light irradiator 3, the optical system 4 and the photoelectric converter 5 based on reflected light from the document 8 passing through the image reading area (document reading position) (hereinafter, referred to as an "image reading apparatus 1A").

The image reading apparatus 1A thus configured does not include the above contact glass 7, but includes a conveying mechanism for conveying the document 8 in the first direction. The image reading apparatus 1A includes a fixedly arranged housing case instead of the above carriage 2 movable in the first direction, and the light irradiator 3, the optical system 4 and the photoelectric converter 5 are arranged in this housing case.

In the image reading apparatus 1A, light is irradiated by the light irradiator 3 to the document 8 conveyed in the first direction by the conveying mechanism and passing through the image reading area. Then, reflected light from the document 8 irradiated with the light by the light irradiator 3 is imaged on the photoelectric converter 5 by the optical system 4 and that imaged optical image is converted into an electrical signal by the photoelectric converter 5. In this way, an image of the document 8 can be read.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An image reading apparatus for reading an image based on reflected light from a document in a predetermined image reading area, comprising:
    a light irradiator configured to irradiate light to a document in the image reading area;
    an optical system configured to image reflected light from the document irradiated with the light by the light irradiator; and
    a photoelectric converter configured to convert an optical image imaged by the optical system into an electrical signal,
    wherein:
    the optical system includes:
        a reflection mirror unit configured to reflect the reflected light from the document to the photoelectric converter and image the reflected light on the photoelectric converter and including a first reflection area and a second reflection area successively provided in a main scanning direction; and
        an aperture unit arranged on an imaging optical path from the reflection mirror unit to the photoelectric converter and including a light shielding portion having light shielding properties and a first light passing hole and a second light passing hole formed to penetrate through the light shielding portion and allow the passage of the light reflected by each of the first and second reflection areas; and
    the photoelectric converter is a line image sensor including a light receiving surface having a first light receiving area and a second light receiving area configured to receive the light passed through each of the first and second light passing holes and successively arranged in the main scanning direction, and configured to convert each optical image based on the light received by each of the first and second light receiving areas into an electrical signal, and a length of the light receiving surface along the main scanning direction is set to be equal to or longer than that of the image reading area along the main scanning direction.

2. An image reading apparatus according to claim 1, wherein:
    the reflection mirror unit is a telecentric optical system configured to image the reflected light from the document in an inverted manner.

3. An image reading apparatus according to claim 2, wherein:
    each of the first and second reflection areas on the reflection mirror unit is configured to image an optical image, which is an inverted image reduced at a predetermined reducing magnification, in each of the first and second light receiving areas on the light receiving surface; and
    a light shielding wall having light shielding properties is provided in a boundary part between the first and second light receiving areas on the light receiving surface.

4. An image reading apparatus according to claim 3, wherein:
    the reflection mirror unit and the aperture unit are integrally formed.

5. An image reading apparatus according to claim 4, further comprising:
    an image data generator configured to generate image data corresponding to an image recorded on a document in accordance with an electrical signal by the photoelectric converter based on each optical image imaged in each of the first and second light receiving areas, wherein:
    the image data generator includes, as processing units for processing each optical image imaged in each of the first and second light receiving areas:
        an enlargement processing unit configured to enlarge at an enlarging magnification which is an inverse of the reducing magnification;
        an inversion processing unit configured to invert the inverted image into an erect image; and
        a coupling processing unit configured to couple each image after processings by the enlargement processing unit and the inversion processing unit.

* * * * *